May 14, 1929.    M. F. H. GOUVERNEUR    1,712,556
INSULATOR SUSPENSION LINK
Filed April 9, 1925

Patented May 14, 1929.

1,712,556

UNITED STATES PATENT OFFICE.

MINOR F. H. GOUVERNEUR, OF BALTIMORE, MARYLAND, ASSIGNOR TO LOCKE INSULATOR CORPORATION, OF BALTIMORE, MARYLAND, A CORPORATION OF MARYLAND.

INSULATOR SUSPENSION LINK.

Application filed April 9, 1925. Serial No. 21,906.

The invention relates to suspension links for connecting insulators of the Hewlett type.

It is well known that insulators of this kind are formed with interlinking curved passages for the reception of suspension elements designed to be connected by some means or other whereby a plurality of insulator units may be formed into a string. The interlinking curved passages are cut while the insulator body is in a plastic condition, subsequently to which the body is dried out and then fired. When cut, the passages are true but it frequently happens that distortion occurs during the firing process, this distortion causing unevenness in the curvature. The usual means for connecting insulators of this type consists of rigid curved links inserted through these passages. If there is any distortion of the curvature of the passages it is readily apparent that there will be certain spots or portions higher than others and that these high spots will be engaged by the connecting links, the strain being consequently concentrated at such points instead of being uniformly distributed as is proper.

It is with the above facts in view that I have designed the present invention which has for its general object the provision of a link of such character that its passage engaging face will conform to any inequalities in the curved passage so that high spots will be compensated for and the strains distributed.

The object of the invention, more specifically stated, is to provide a suspension link having secured or united thereto a liner of ductile metal readily capable of withstanding the compression strains to which it is subjected in service while possessing sufficient ductility or pliability as to "flow" and conform to the curved passage surface engaged thereby.

In my companion application filed April 9, 1925, Serial No. 21,907, I have described and illustrated a lined suspension link adapted particularly for use in connection with Hewlett insulators of that variety in which the link receiving passages are circular in cross section. However, in constructing a lined link or a lining for a link of the flat type designed for use in connection with a variety of Hewlett insulators in which the link receiving passages are relatively wide and shallow, certain difficulties are encountered which require a somewhat different construction.

The object of the present invention is to provide a liner possessing the above mentioned characteristics but adapted for use in connection with links of the flat type.

To the attainment of the foregoing objects and advantages the invention may consist in the details of construction and arrangement of parts to be hereinafter more fully described, illustrated and pointed out in the appended claims.

In the drawing wherein like reference characters designate corresponding parts throughout the several views.

Figure 1:
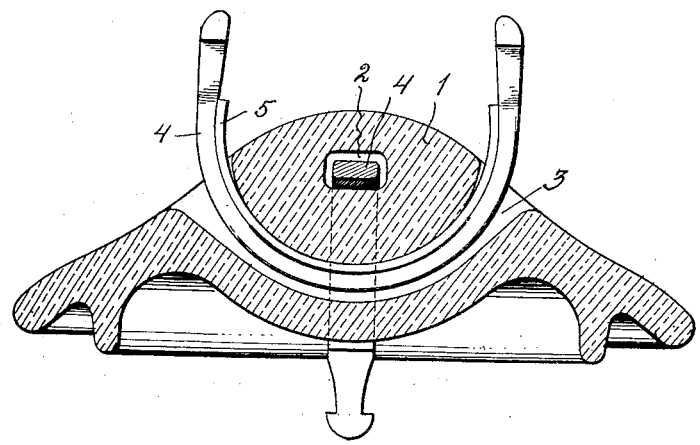
Figure 1 shows a vertical cross section through an insulator, showing a pair of links in operative position, one link being in side elevation and the other in section, the links being equipped with my liner.

Referring to the drawing in detail the numeral 1 designates an insulator of the well known Hewlett type provided with reversely or oppositely arranged curved interlinking passages 2 and 3 for the reception of similar links 4 which may have any desired terminal construction in order that the links of adjacent units may be connected to form a string.

In carrying out the invention I provide each link with a liner designated generally by the numeral 5, which liner is secured to or united with the link so as to remain a permanent part thereof. This liner, broadly considered, may consist of a strip of yieldable material of a more or less elastic nature, metallic or otherwise, enclosed within a protective sheath, cover or envelope, one exemplification being the utilization of a strip of asbestos or its equivalent encased within a cover of zinc or the like. While this liner might vary in its details of construction and arrangement as indicated above, I have shown it as consisting, preferably, of a strip 6 of ductile material capable of "flowing" under pressure to conform to an engaging surface, a highly satisfactory material being an alloy of lead and antimony or its equivalent, a convenient proportion of the ingredients being ninety-six per cent of lead and four per cent of antimony, the latter ingredient being used in such quantity as to have a slight hardening action without destroying the ductility of the alloy. Owing to the limited space within the curved passages and owing to the fact that the cross sectional size of the link cannot be decreased to any great extent, the strip 6 is necessarily thin, a fact which presents obstacles to the employment of ordinary methods of joining the liner to the link.

In my co-pending application above mentioned I have shown a liner which, being relatively thick, on account of its being designed for use in connection with insulators having passages circular in cross section, is soldered or brazed directly onto the inner face of the link, the link being heated, the liner clamped thereagainst and solder applied to portions of the edges. I prefer, in the present case, to join the liner to the link by the same method but owing to the thinness of the ductile strip, melting and distortion thereof, and possibly destruction, would occur if the liner were to be placed in direct contact with the link. For these reasons I preferably provide a protective envelope 7 enclosing the strip 6, this envelope being constructed of some metal having a melting point higher than the temperature to which the link and the liner must be subjected to effect uniting by means of solder or the like. While there is no limitation desired in this respect, zinc is highly suitable for the purpose. Actually, the construction of this envelope might vary within wide limits though I have illustrated it as including a strip 8 of substantially the same width as the strip 6 and disposed against one flat face thereof, and a wider strip 9 disposed against the opposite flat face of the ductile strip 6 with its side edges curled over the side edges of the strip 6 and terminating in flanges 10 engaging against the outer face of the strip 8.

Figure 2:
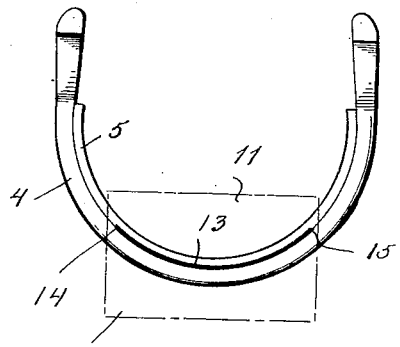
Figure 2 is a side elevation of one of the links, showing the liner in applied position and illustrating, diagrammatically, the mode of securing the liner to the link.
Figure 3:
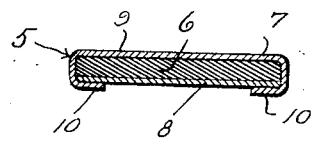
Figure 3 is an enlarged cross sectional view taken through the liner alone prior to its application to the link.

The complete liner including the envelope containing the ductile strip or cushion element is preferably initially curved to conform to the curvature of the inner side of the link 4 and is disposed thereagainst. The link itself may be heated to a temperature, say of 600° F. prior to the disposition of the liner thereagainst and the two are held together as for example by means of any suitable jaw members 11 and 12 or the like indicated by dot and dash lines in Figure 2. Solder or its equivalent is then run along portions of the edges of the link and liner, the exact length of the resultant soldered joint 13 being immaterial though it need not and preferably should not extend the full length, it being sufficient for it to extend between the points 14 and 15.

Assuming that the liner has been applied as above indicated, or secured by any other equivalent and suitable means, the link is used in exactly the same manner as the ordinary type but it is quite obvious that owing to the provision of the liner embodying the ductile strip or cushion the link can readily accommodate itself to inequalities in the confronting surface of the link receiving passage so that no undue strain will be brought at any point as a uniform bearing surface will be had.

While I have shown and described a preferred embodiment of the invention, it should be understood that I reserve the right to make such changes in the form, construction and arrangement of parts as will not depart from the spirit of the invention or the scope of the subjoined claims.

Having thus described the invention, I claim:

1. An insulator suspension link including a curved body provided on its inner face with a liner formed as a strip of yieldable material enclosed within an envelope of a nature capable of conforming to irregularities in the surface of an insulator.

2. In a suspension link, a curved body, and a liner secured to the inner face thereof, the liner including a cushioning strip of relatively ductile metal and a protective envelope of harder metal, having sufficient ductility to conform to irregularities in an insulator surface engaged thereby.

3. In a suspension link, a curved body, and a liner secured to the inner face thereof, the liner including a cushioning strip of relatively ductile metal and a protective envelope of harder metal, the cushioning strip consisting of an alloy of lead and a hardening agent, the envelope being of a nature capable to conform to an insulator surface engaged thereby.

4. An insulator suspension link comprising a body, and a liner joined thereto, the liner including a strip of ductile metal and a protective envelope therefor whereby the liner may be joined to the body with the application of heat, the envelope preventing destruction of the ductile strip and possessing the quality of conforming to the surface of an insulator engaged thereagainst.

5. An insulator suspension link including a body formed to engage through an insulator, and a liner secured to the insulator engaging face of the body, the liner including a strip of cushioning material and a protective envelope therefor capable of conforming to irregularities in the insulator surface engaged thereby.

6. An insulator suspension link including a body formed to engage through an insulator, and a liner secured to the insulator engaging face of the body, the liner including a strip of cushioning material and a protective envelope therefor, the envelope including strips engaged upon opposite sides of the cushioning strip and embracing the edges thereof, the material of the envelope being such as to accommodate itself to irregularities in an insulator surface engaged thereby.

7. An insulator suspension link liner comprising a strip of ductile material and a metallic envelope therefor entirely enclosing the same, that portion of the envelope engageable with an insulator having sufficient ductility to conform to irregularities in the surface of an insulator engaged thereby.

8. An insulator suspension link liner comprising a strip of ductile material and a metallic envelope therefor entirely enclosing the same, the envelope including a strip disposed against one face of the first-named strip, and a strip disposed against the other face of the first-named strip and having marginal flange portions embracingly engaging the edges of the first and second named strips and the outer face of the second-named strip, the strip engageable with an insulator being of a material capable of conforming to irregularities in the insulator surface engaged thereby.

9. In an insulator suspension link, the combination with a body adapted for engagement with an insulator, of a liner disposed against the insulator engaging face of the body and adapted to be united thereto by the application of heat, the liner including a cushioning strip of ductile metal and a protective envelope therefor formed of a metal of a higher fusing point than the cushioning strip whereby to prevent destruction of the cushioning strip as the result of heat application, the envelope further serving to prevent undue distortion of the cushioning strip under strain, the envelope being formed of material of a nature capable of accommodating itself to inequalities in an insulator surface engaged thereby.

10. An insulator suspension link liner formed as a cushion member of yieldable material and a protective envelope therefor capable of being secured to a suspension link and formed of a metal capable of accommodating itself to irregularities in an insulator surface.

11. In combination with an insulator suspension link having a flat surface, a liner of cushioning material enclosed within a protective envelope having a flat surface engaging against the flat surface of the link, the envelope being formed of a metal capable of conforming to irregularities in the surface of an insulator engaged thereby.

12. In combination with an insulator suspension link, a liner including a core of yieldable material enclosed within a protective envelope of metal capable of conforming to the surface of an insulator engaged thereby.

13. In combination with an insulator suspension link, a liner including a core of yieldable material enclosed within a protective envelope of metal capable of conforming to the surface of an insulator engaged thereby, the lined side of the link being flat and the link engaging surface of the liner being correspondingly flat.

14. In combination with an insulator suspension link, a liner including a core of yieldable material enclosed within a protective envelope of metal capable of conforming to the surface of an insulator engaged thereby, the engaging surfaces of the link and liner being flat and the liner covering substantially the entire width of the link.

15. In combination with an insulator suspension link, a liner including a core of yieldable material enclosed within a protective envelope of metal capable of conforming to the surface of an insulator engaged thereby, the engaging surfaces of the link and liner being flat and the liner covering substantially the entire width of the link, the surface of the liner adapted to engage an insulator being likewise flat.

16. An insulator suspension link having its insulator engaging face equipped with a liner extending substantially entirely thereacross and formed as a cushion member of yieldable material provided with a protective element of metal capable of conforming to irregularities in the insulator surface engaged thereby and facilitating attachment of the liner to the link.

17. An insulator suspension link having its insulator engaging face equipped with a liner extending substantially entirely thereacross and formed as a cushion member of yieldable material provided on its insulator engaging face with a protective element of metal capable of conforming to irregularities in the insulator surface engaged thereby, the protective element extending beyond the edges of the cushion member.

18. An insulator suspension link of curved formation, a cushion member of yieldable material disposed against the concave side thereof, and a protective element disposed against the concave side of the cushion member in embracing relation to the edges thereof and secured to the link, the protective element being of a material capable of conforming to inequalities in an insulator surface engaged thereby.

In testimony whereof I affix my signature.

MINOR F. H. GOUVERNEUR.